(12) United States Patent
Keich et al.

(10) Patent No.: US 11,168,607 B2
(45) Date of Patent: Nov. 9, 2021

(54) METHOD FOR OPERATING AN INTERNAL COMBUSTION ENGINE, CONTROL UNIT, AND ELECTRICALLY DRIVEN CHARGING DEVICE

(71) Applicant: Volkswagen Aktiengesellschaft, Wolfsburg (DE)

(72) Inventors: Sebastian Keich, Braunschweig (DE); Javier Bartolome, Braunschweig (DE); Florian Frese, Braunschweig (DE); Sebastian Heinken, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/805,024

(22) Filed: Feb. 28, 2020

(65) Prior Publication Data
US 2020/0277892 A1 Sep. 3, 2020

(30) Foreign Application Priority Data
Feb. 28, 2019 (DE) ..................... 10 2019 202 707.5

(51) Int. Cl.
*F02B 37/10* (2006.01)
*F02B 37/14* (2006.01)
*F02D 41/00* (2006.01)

(52) U.S. Cl.
CPC .............. *F02B 37/10* (2013.01); *F02B 37/14* (2013.01); *F02D 41/0007* (2013.01)

(58) Field of Classification Search
CPC .......... F02B 37/04; F02B 37/10; F02B 37/12; F02B 2037/122; F02B 37/14; F02B 39/10; F02D 2200/503; F02D 41/0007; F02D 23/00–02
See application file for complete search history.

(56) References Cited

U.S. PATENT DOCUMENTS

| | | | |
|---|---|---|---|
| 6,938,420 B2 * | 9/2005 | Kawamura | F02D 41/0007 60/612 |
| 7,263,832 B2 | 9/2007 | Nau et al. | |
| 7,367,189 B2 | 5/2008 | Ishiwatari | |
| 7,503,175 B2 | 3/2009 | Isogai | |
| 10,087,822 B2 | 10/2018 | Hirayama | |

(Continued)

FOREIGN PATENT DOCUMENTS

| | | |
|---|---|---|
| DE | 102 03 974 A1 | 8/2003 |
| DE | 102 23 810 A1 | 12/2003 |

(Continued)

*Primary Examiner* — Jesse S Bogue
*Assistant Examiner* — Loren C Edwards
(74) *Attorney, Agent, or Firm* — Muncy, Geissler, Olds & Lowe, P.C.

(57) ABSTRACT

A method for operating an internal combustion engine with a system for supercharging that includes an exhaust turbocharger and an electrically driven charging device for dynamic assistance during build-up of boost pressure, with: determining a drive criterion of the charging device, establishing an initial quantity of the drive criterion; continuously determining a reduction factor for the drive criterion within a balance period; applying the reduction factor to the initial quantity of the drive criterion; and operating the charging device with the drive criterion reduced by the reduction factor.

16 Claims, 3 Drawing Sheets

(56) References Cited

U.S. PATENT DOCUMENTS

| | | |
|---|---|---|
| 10,669,955 B2 | 6/2020 | Hata et al. |
| 2003/0005695 A1 | 1/2003 | Allen et al. |
| 2003/0106541 A1* | 6/2003 | Dixon .................... F02B 39/10 123/565 |
| 2003/0141851 A1 | 7/2003 | Nau et al. |
| 2004/0093867 A1 | 5/2004 | Masuda |
| 2009/0320468 A1 | 12/2009 | Shimizu et al. |
| 2011/0174278 A1 | 7/2011 | Watanabe et al. |
| 2013/0255647 A1 | 10/2013 | Akashi et al. |
| 2013/0265647 A1 | 10/2013 | Kern |

FOREIGN PATENT DOCUMENTS

| | | |
|---|---|---|
| DE | 102006000072 A1 | 10/2006 |
| DE | 10 2008 000 072 A1 | 7/2009 |
| DE | 10 2015 006 401 A1 | 11/2016 |
| EP | 2 123 882 A1 | 11/2009 |
| EP | 2 940 269 A1 | 11/2015 |
| EP | 3103991 A1 | 12/2016 |
| EP | 3396132 A1 | 10/2018 |
| JP | 2007-270766 A | 11/2005 |
| JP | 2008-193790 A | 8/2008 |
| WO | WO 2004/011791 A1 | 2/2004 |
| WO | WO 2005/108755 A1 | 11/2005 |

\* cited by examiner

METHOD FOR OPERATING AN INTERNAL COMBUSTION ENGINE, CONTROL UNIT, AND ELECTRICALLY DRIVEN CHARGING DEVICE

This nonprovisional application claims priority under 35 U.S.C. § 119(a) to German Patent Application No. 10 2019 202 707.5, which was filed in Germany on Feb. 28, 2019, and which is herein incorporated by reference.

BACKGROUND OF THE INVENTION

Field of the Invention

The present invention relates to a method for operating an internal combustion engine with a system for supercharging that includes an exhaust turbocharger and an electrically driven charging device for during build-up of boost pressure. The invention also relates to a control unit that is equipped to carry out the method according to the invention, an electrically driven charging device that can be operated in accordance with the method, an internal combustion engine with such a charging device, and a motor vehicle with a correspondingly equipped internal combustion engine. The electrical charging device in this context can be used for transient dynamic assistance or for steady-state assistance through a stable increase in the engine torque.

Description of the Background Art

Modern internal combustion engines (diesel and gasoline engines, in particular) are supercharged to ever higher levels to reduce fuel consumption. In this process, the compression ratios are increased more and more through a consistent increase in the boost pressure. Especially modern Miller cycle combustion processes, or those in which low-pressure exhaust gas recirculation is implemented, require very high supercharging rates in order to meet the high requirements for the desired driving performance.

Customarily, supercharging is accomplished through compressors mechanically coupled to the crankshaft and through exhaust turbochargers thermodynamically coupled to the exhaust gas flow and to the charge air flow, which compress the charge air. Such charging devices are coupled to the operating state (torque, speed) of the internal combustion engine, however, and, especially at low speeds, do not deliver the desired high supercharging rate.

In modern engine concepts with such exhaust turbochargers (turbos), electrically driven charging devices are provided in addition for so-called "e-boosting." These devices can, on the one hand, be electrically driven compressors (EDC), which are arranged in the charge air path of the engine and act either upstream or downstream of the compressor unit of the exhaust turbocharger viewed in the direction of flow. As a general rule, they are driven under speed control by an electric motor.

Another concept relates to so-called electrically assisted turbochargers (EAT), in which the rotor assembly of the exhaust turbocharger can additionally be accelerated under torque control with a controllable electric drive. In the case of steady-state assistance, an additional torque can be persistently impressed as well. The electric drive in this case can be arranged on the drive shaft between the turbine rotor and the compressor rotor of the exhaust turbocharger, or even at a shaft end adjoining the turbine rotor or adjoining the compressor. In this way, additional boost pressure for increasing the boost pressure of the conventional turbo can be made available by means of the electrical energy supplied. As a result, the responsiveness of the internal combustion engine to a driver command for acceleration can be improved by additionally increasing the boost pressure, namely in operating states in which the exhaust turbocharger cannot yet achieve sufficient additional increase in boost pressure under normal operating conditions (elimination of so-called turbocharger lag).

In order to efficaciously operate such an electrically driven charging device (EDC or EAT) and to improve the dynamic behavior of the internal combustion engine, however, certain boundary conditions must be met. To begin with, operation should only take place within thermodynamically reasonable limits, it must be possible to make sufficient electrical energy available in the vehicle electrical system, and the maximum operating temperatures of the electrical components cannot be exceeded.

Additional requirements may include that exclusively, or primarily, recuperated energy should be used for electrically controlled boost pressure increase. In this way, it would be possible to achieve fuel-consumption-neutral or $CO_2$-neutral e-boosting.

If one of the abovementioned conditions is not fulfilled or is only partially fulfilled, however, electrically assisted boost pressure increase is not available to the driver, and the acceleration behavior of a vehicle is suddenly degraded or the torque drops unexpectedly and has an adverse effect on the driving experience.

The known approaches for controlling an EDC or an EAT are not capable of completely eliminating these disadvantages or of taking into account a complex consideration of different boundary conditions such as battery state of charge (SoC), component temperature, and/or recuperation status of the available electrical energy.

A device for controlling an electrically operated charger is known from DE 102 23 810 A1 in which a state of a voltage supply for operating the electric charger is ascertained and a restriction that is to be expected in the operation of the electric charger is signaled as a function of the state of the voltage supply. Although the driver is warned here of degraded driving performance, an abrupt degradation in driving performance cannot be prevented with this approach.

Other approaches, such as are known from DE 10 2015 006 401 A1, for example, are also limited to the control of an electric charging device while taking into account boundary conditions such as, e.g., a maximum possible current draw from the energy storage device, but do not prevent an abrupt discontinuation of the e-boost functionality.

An approach is known from DE 102 03 974 A1, which corresponds to U.S. Pat. No. 7,263,832, in which the control of an electrically driven charger takes place such that a rate of change for an increase in the speed of the electric charger is specified as a function of a prevailing supply voltage, and a critical voltage drop is thus prevented that could otherwise occur during operation of the electric charger. The e-boost function may possibly be restricted unexpectedly here, too.

SUMMARY OF THE INVENTION

It is therefore an object of the invention to provide an improved method for operating an internal combustion engine with a system for supercharging that includes an exhaust turbocharger and an electrically driven charging device for dynamic assistance (e-boost function) during build-up of boost pressure, and in doing so to eliminate at least some of the known disadvantages. In particular, the object is to improve such a method in such a manner that the control of the electrically driven charging device can take place while taking recuperatively obtained energy into account.

In an exemplary embodiment, a method is provided for operating an internal combustion engine with a system for supercharging that includes an exhaust turbocharger and an electrically driven charging device for dynamic assistance and/or for steady-state torque increase during build-up of boost pressure has the following steps: determining a drive criterion of the charging device; establishing an initial quantity of the drive criterion; continuously determining a reduction factor for the drive criterion within a balance period; applying the reduction factor to the drive criterion; operating the charging device with the drive criterion reduced by the reduction factor Two important goals in operating the electrically driven charging device can be achieved through the cyclic determination of a reduction factor for the drive criterion within a balance period. Firstly, it is possible to take into consideration a wide variety of boundary conditions that must be taken into account in operation of an electrically driven charging device (available electrical energy in the vehicle electrical system, state of charge of a battery, temperature boundary conditions for various components, fuel-consumption-neutral/$CO_2$-neutral operation of the electrically driven charging device). In addition, the cyclic or continuous determination of the reduction factor within a balance period ensures, with suitable selection of said balance period, that the reduction factor does not change abruptly, and therefore there is also no abrupt or surprising change in the handling characteristics. If, for example, the state of charge of a battery changes such that the charge decreases, then the reduction factor is changed in small steps or continuously, and is adapted to the state of charge (SoC) that exists in each case. If the state of charge now decreases over multiple cycles or during a balance period, then the dynamic assistance provided by the electrically driven charging device during build-up of boost pressure decreases continuously so that the reduction, which is only slight in each case, is scarcely perceptible to the driver.

It is possible here to adapt the balance period as a function of an operating state profile. For example, if it turns out that operating states change comparatively rapidly (great thermal fluctuations, great fluctuations in battery state of charge, frequent changes in the engine operating state (acceleration)), then the balance period can be shortened accordingly. Conversely, the balance period can also be lengthened if stable operating states are detected. The method thus permits extremely adaptable dynamic assistance without sudden or abrupt changes occurring in the vehicle's handling characteristics.

The drive criterion can include, for example, one of the following quantities: drive torque, drive speed, supply current, and/or supply voltage. As a result, different concepts for the electrically driven charging device can be taken into account. EDCs are usually controlled by controlling the drive speed in order to set a desired boost pressure (dependent on the operating point). To this end, an EDC is usually coupled to a power electronics unit, which then sets an appropriate current or an appropriate voltage for driving the electric motor.

In the case of electrically assisted turbochargers (EAT), in contrast, torque-dependent controls are usually implemented. Here, too, the electric drive motor is controlled through an appropriate power electronics unit with an adjustable electric current or an adjustable electric voltage.

There are methods in which the reduction factor, which can be composed of multiple subfactors, includes an electric consumption/recuperation factor $X_{Eco}$, which takes into account how great the proportion is of recuperatively obtained energy that is available in the electrical energy storage device (battery). As a result, the charging device can be operated in a manner that takes into account the recuperatively available energy. Fuel-consumption-neutral operation of the charging device is thus possible by taking into account that only recuperatively available electrical energy is used for operating the charging device.

In this context, different approaches can be pursued for utilizing recuperative energy. Electrically driven compressors generally do not have their own recuperation capability. Nevertheless, it is possible to supply them with recuperatively obtained energy, which is obtained through a belt starter generator (BSG) in coasting operation of a vehicle, for example. It is also possible here to provide only a specific proportion, which is to say a specific percentage, of the energy obtained recuperatively in this way for operating the charging device (here, the electrically driven compressor).

Electrically assisted turbochargers, in contrast, can be designed such that they themselves deliver recuperative energy for charging an energy storage device by means of the electric machine acting on the rotor assembly shaft. This energy can be captured and then delivered again during the driving (which is to say the electrical assistance) of the EAT. In this way, the electrical assistance of the EAT is to be controlled such that it can be implemented in a fuel-consumption-neutral, and thus $CO_2$-neutral, manner.

The reduction factor can optionally also include one of the following factors: a thermodynamic factor $f_{thermo}$, a state of charge factor $f_{SoC}$, and/or one or more temperature factors $f_{Temp}$.

In this context, the thermodynamic factor takes into account thermodynamically reasonable operating states of the EDC or of the EAT. This is accomplished in a characteristic-map-controlled manner, for example, in that a desired or required boost pressure can be retrieved for a particular operating point, and a specific operating state (speed, torque) of the charging device then corresponds in turn to said boost pressure. In the case of an EDC, a maximum possible speed $M_{max,\ EDC}$ is set in this way to a thermodynamically reasonable speed for achieving the desired boost pressure, for example. In the case of an EAT, a maximum possible drive torque $M_{max,\ EAT}$ is reduced in a similar manner to a thermodynamically reasonable drive torque in order to set the desired boost pressure.

A state of charge factor in this context takes into account the state of charge of an electrical supply system. This can relate to the state of charge of an electric battery but also can relate equally well to the operating state of a current-supplying generator during engine operation.

The temperature factor can take into account one or more component temperatures that can be critical to operation of the charging device (for example, an operating temperature of the power electronics, a compressor discharge temperature of the exhaust turbocharger, a temperature of relevant electromagnetic components of the electric motor).

The consumption/recuperation factor can be determined by the means that an energy difference $\Delta E_{Eco}$, determined over a second balance period between a recuperated energy quantity $E_{Recu}$ and an assistance energy quantity $E_{Boost}$, and a demand energy quantity $E_{demand,Boost}$, determined in the first balance period, are taken into account using the following relationship.

$$X_{Eco} = \frac{\Delta E_{Eco}}{E_{demand,Boost}}$$

The second balance period in this context can relate to a total operating time of the engine or a trip duration. In this second balance period, the total recuperated energy and the total retrieved assistance energy (boost energy) are offset against one another and balanced.

In the (first) balance period, which also corresponds to the duration of the continuous determination of the reduction factor, a demand energy quantity can be derived from the individual handling characteristics. This corresponds to a predicted or expected energy demand that is to be used to operate the charging device. The quotient formed therefrom specifies how much the drive criterion is reduced. For example, if the demand energy quantity that is determined is below the energy difference between the recuperated energy quantity and the assistance energy quantity, then no reduction takes place. However, if the demand is above it, the reduction factor takes effect and reduces the drive criterion correspondingly.

The first balance period can be less than the second balance period. In this way, it is possible to ensure that the determination cycles for the reduction factors are short enough that no clearly perceptible reduction in the additional electrical power, which is to say the compressor output, is discernible.

In this context, it has proven to be the case that the duration of a first balance period is between 1 and 10 min, and preferably is between 2 and 3 min.

The consumption/recuperation factor may be only taken into account when it is less than one.

The thermodynamic factor can be determined in such a way that it reduces a maximum of the drive criterion such that a maximum thermodynamically reasonable boost pressure can be built up during the dynamic assistance by means of the charging device. This thermodynamic factor is important for preventing an ineffectual (over-)operation of the charging device with needlessly excessive power consumption.

The state of charge factor can be determined from a difference between an actual state of charge and a state of charge limit. In this way, it is possible to make allowance for the availability of a desired energy reserve when the charging device is to be operated. It is thus possible to prevent operation of the charging device from causing a drop below a definable state of charge limit. Here, too, it continues to be the case that the action of the charging device is reduced gradually, which is to say continuously, scarcely perceptibly, and not abruptly or surprisingly, as a result of the cyclic determination when the state of charge limit is approached.

The temperature factor can be determined from a difference between a critical component temperature and an actual component temperature. In order to achieve a reduction factor between zero and one, use is made for this purpose of the relationship that the difference between the critical component temperature and the actual component temperature is placed in a ratio to the critical component temperature.

An internal combustion engine can be operated in the desired manner by means of a control unit that is equipped to adjust the system for supercharging according to the method of the invention. The invention also relates, in particular, to an electrically driven charging device that is designed as an EAT or an EDC, and can be operated according to the method of the invention. Here, the drive criterion is a drive torque in the case of a charging device designed as an EAT, and is a drive speed in the case of a charging device designed as an EDC.

In addition, the invention also relates to an internal combustion engine with such a charging device, and to a motor vehicle with such an internal combustion engine.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
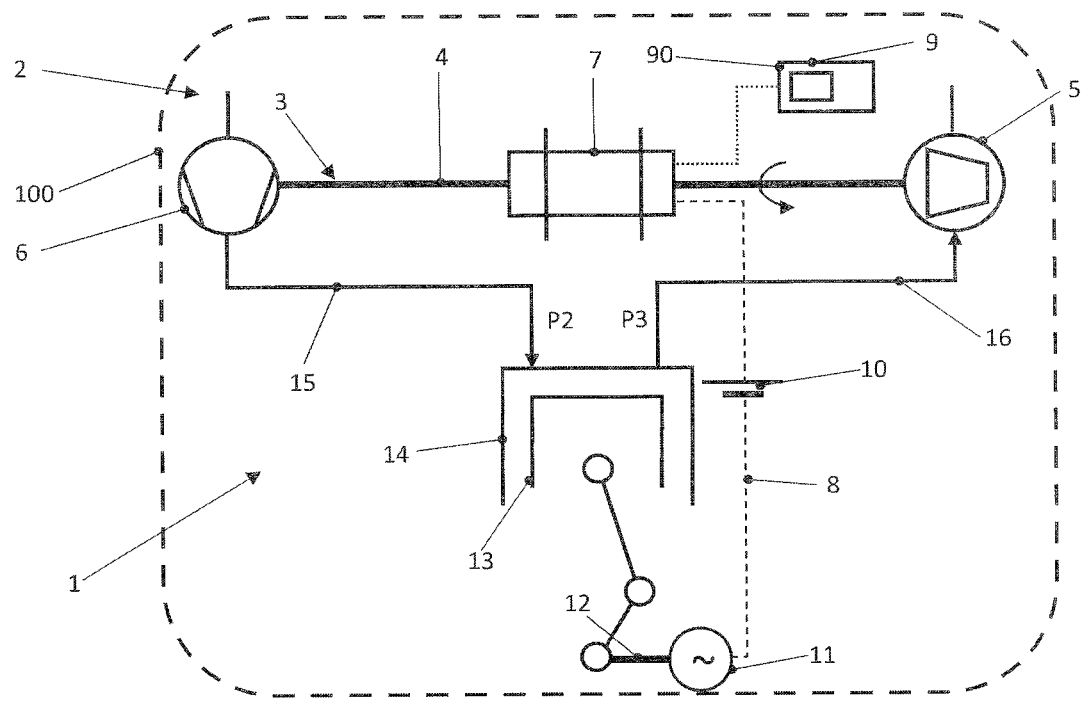
FIG. 1 shows a schematically represented internal combustion engine with an EAT that is suitable for carrying out the method according to the invention.

FIG. 1 shows an exemplary embodiment of an internal combustion engine 1 according to the invention in a vehicle 100 with a system 2 for supercharging with an exhaust turbocharger (turbo) 3, which here is implemented as an electrically assisted turbocharger (EAT), in which an electric motor 7 is arranged on a rotor assembly shaft 4 that couples the turbine 5 with the compressor 6, which electric motor is supplied with energy through a vehicle electrical system 8, and which can be controlled through a control unit 9 (ECU).

The vehicle electrical system 8 has a power storage device 10 and an electric machine 11—for example, a belt starter generator (BSG)—which can be operated both as a generator and as a motor, and which is mechanically coupled to the crankshaft 12. The crankshaft 12 is driven by one or more pistons 13 of the cylinder(s) 14 of the internal combustion engine. Air is supplied to the cylinder 14 through the intake tract 15, and the exhaust gas formed there is removed through the exhaust tract 16. In this process, the fresh air is passed through the compressor 6, is compressed there when the exhaust turbocharger 3 is operated, and is delivered into the cylinder 14 at the boost pressure $p_2$. When this takes place, fuel is supplied, ignition takes place in the cylinder 14 (spark ignition or self-ignition) and the exhaust gas is passed into the turbine 5 at the exhaust gas back pressure $p_3$, where a portion of the exhaust gas enthalpy drives the turbine 5 and thus the compressor 6, these being coupled to one another through the rotor assembly shaft 4.

Together with the exhaust turbocharger 3, the electric motor 7 forms an electrically driven or drivable charging device. Control here takes place through the control unit 9, the function of which is explained in detail further below. Essentially, the EAT 3 serves to build up the boost pressure $p_2$ and to provide dynamic assistance during acceleration. Especially during acceleration from comparatively low speed ranges, the effect of the exhaust turbocharger 3 that is not additionally driven is only very limited to start with (turbocharger lag). The electric motor 7 is now additionally driven in this speed range and makes available a drive torque $M_{set, EAT}$ that additionally drives the compressor 6 and thus provides an increased boost pressure $p_2$ even at low speeds.

The electric motor 7 is implemented as an electric machine that can work both as a generator and as a motor. As a result, electrical energy can be recuperated through the electric motor 7 during deceleration by means of the drive of the turbine 5, and fed into the vehicle electrical system 8 or into the power storage device 10. In this process, both the recuperated energy portion $E_{Recu}$ and an energy portion $E_{Boost}$ drawn for dynamic assistance are captured in the controller 9 during a balance period $t_{v2}$ and, if applicable, are balanced against each other (see below).

Figure 2:
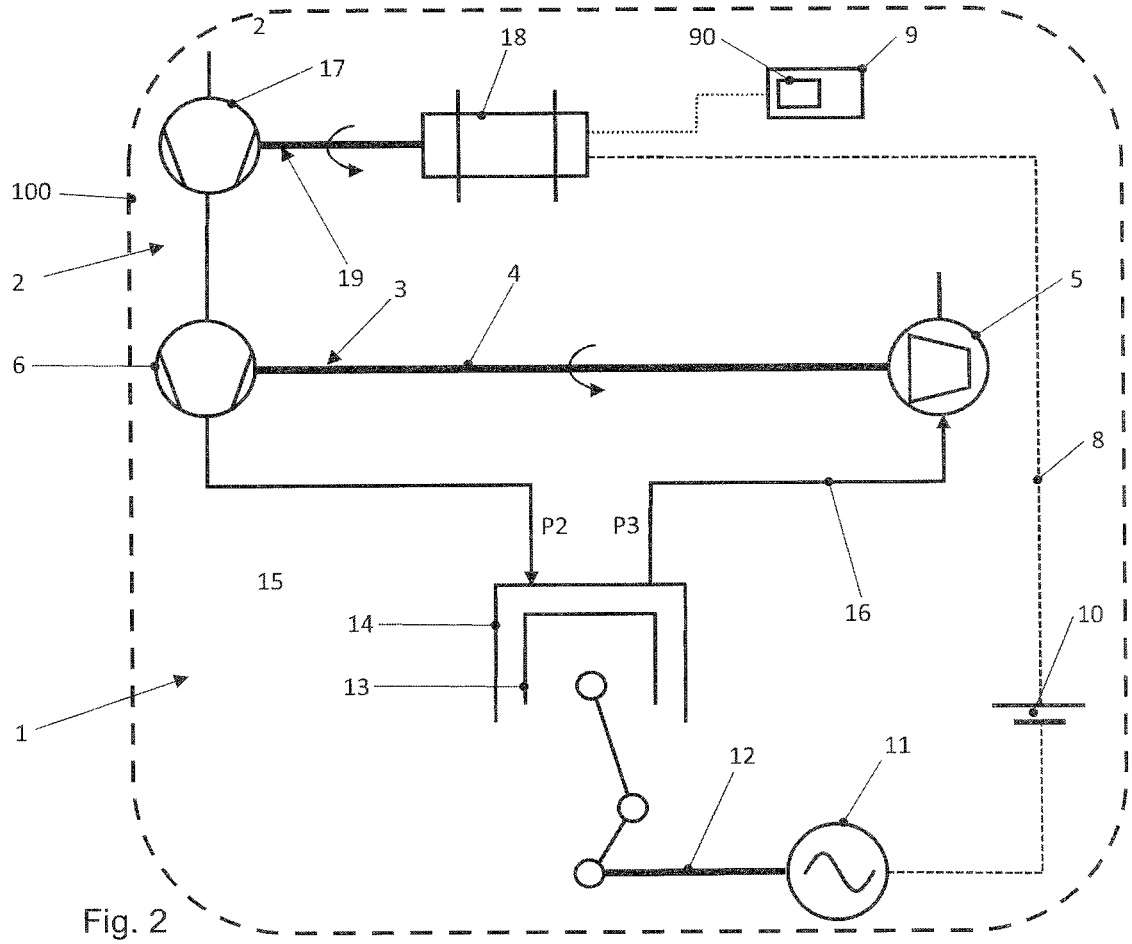
FIG. 2 shows a schematic representation of an internal combustion engine with an EDC that is suitable for carrying out the method according to the invention.

FIG. 2 shows a second exemplary embodiment of an internal combustion engine 1 according to the invention. In the system for supercharging 2, the electrically driven charging device is implemented here as an electrically driven compressor (EDC) 19, which is operated independently of the exhaust turbocharger 3. In this design, a separate compressor 17 is arranged in the intake tract 15 and can be driven by an electric motor 18, which likewise is supplied with power through the vehicle electrical system 8 and is controlled through the control unit 9. The compressor 17 here is located upstream of the compressor 6 of the exhaust turbocharger when viewed in the direction of flow. Embodiments exist in which the compressor 17 of the EDC is located downstream of the compressor 6 of the exhaust turbocharger 3 when viewed in the direction of flow.

The electric motor 18 functions in the same way as the electric motor 7. The EDC 19 serves to provide dynamic assistance during build-up of the boost pressure, especially in low speed ranges (e-boost mode). However, the EDC 19 is not capable of feeding recuperated energy into the vehicle electrical system 8.

It is possible, however, to operate the electric motor 18 through recuperated energy that is fed into the vehicle electrical system through the electric machine 11 (BSG).

In addition, it is also possible in the embodiment from FIG. 1 to control the electric machine 11 in such a manner that it is driven from the energy recuperated by means of the electric motor 7, and thus the additional energy is available directly at the crankshaft 12 in a manner that is effective for the drive.

Figure 3:
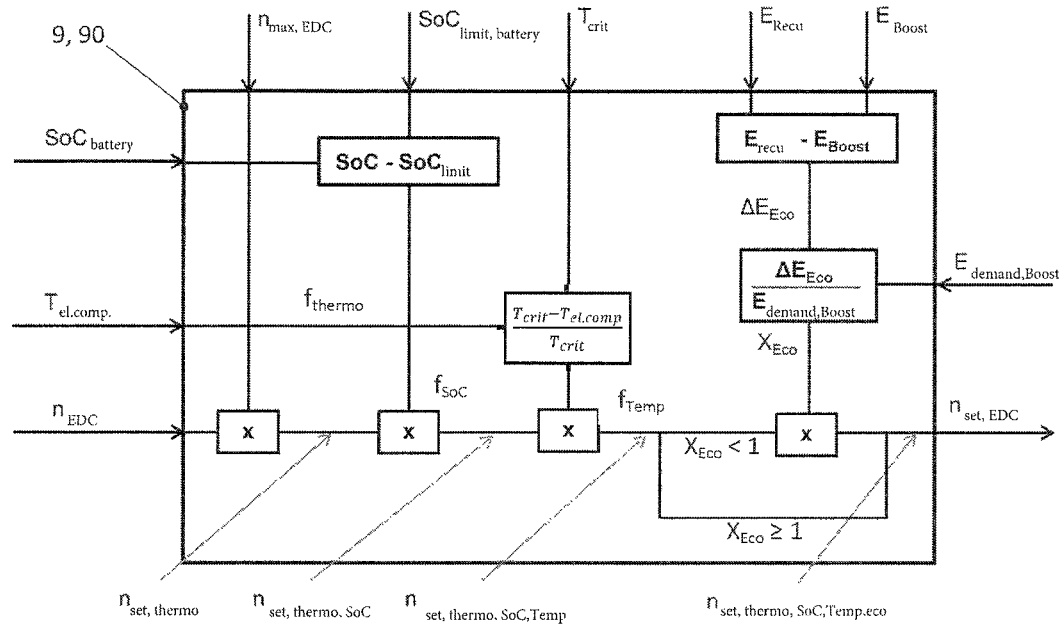
FIG. 3 shows a schematic representation that illustrates the determination of the correction factor with an EDC.

FIG. 3 shows the control of the electrically driven charging device by means of the electrically driven compressor EDC 19 (FIG. 2). The control unit 9 receives multiple signals for this purpose, which are represented by incoming arrows. The control of the electric motor 18 by the electrically driven compressor 19 takes place under speed control. For this purpose, the control unit 9 includes a control section 90 (shown in FIG. 3 and FIG. 4), which processes corresponding signals in order to determine a speed setpoint $n_{set, EDC}$ using the method according to the invention. The speed $n_{EDC}$ constitutes the drive criterion of the charging device here. In order to determine the speed setpoint $n_{set, EDC}$, a thermodynamically reasonable speed $n_{set, thermo}$ is first derived starting from a technically possible maximum speed $n_{max, EDC}$ and a thermodynamic reduction factor $f_{thermo}$. The factor $f_{thermo}$ results from a characteristic map, for example, in which specific boost pressures $p_2$ are associated with specific operating points, and a speed $n_{set, thermo}$ or a thermodynamic reduction factor $f_{thermo}$, which reduces the maximum speed $n_{max, EDC}$ accordingly, is associated with each of these boost pressures $p_2$. It is ensured in this way that the EDC 19 is only driven at those speeds for which a reasonable boost pressure $p_2$ is made available as a function of operating point.

Figure 4:
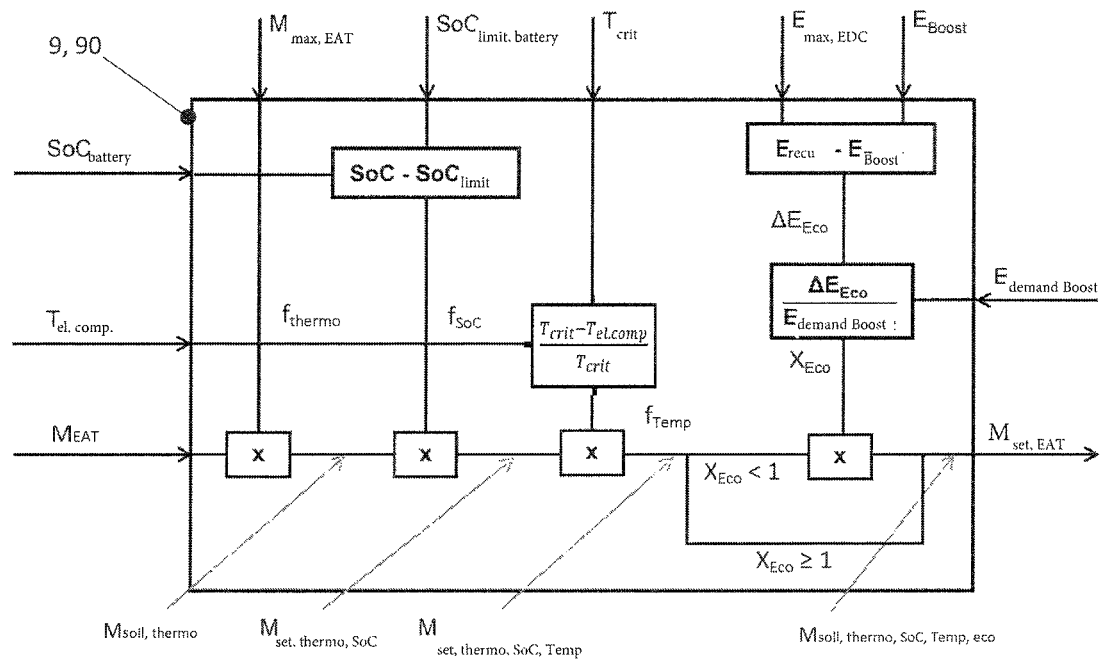
FIG. 4 shows a schematic representation that illustrates the determination of the correction factor with an EAT.

Additional boundary conditions are taken into account as follows:

The boundary conditions represented in FIG. 4 relate to a state of charge (SoC) of the battery 10 of the vehicle electrical system 8, which can vary between 1 (fully charged) and 0 (fully discharged). A state of charge factor $f_{SoC}$ is determined from this state of charge $SoC_{battery}$ and a state of charge limit $SoC_{limit, battery}$ by taking the difference. The state of charge limit $SoC_{limit, battery}$ describes here the maximum allowed discharge of the vehicle battery, and is a quantity that is vehicle-specific, for example, and may also be adjustable, which can be freely chosen between 0 and 1. The calculation of the state of charge factor $f_{SoC}$ as the difference between the instantaneous state of charge of the battery $SoC_{battery}$ and the state of charge limit ensures now that no drop below the state of charge limit occurs in that the state of charge factor $f_{SoC}$, which likewise fluctuates between 1 and 0, reduces the speed $n_{set, thermo}$ to a speed $n_{set, thermo, SoC}$ as necessary.

As an additional criterion, a thermal reduction factor $f_{Temp}$ is determined, which takes into account the temperature of one or more drive-critical components. These can be temperatures of the electric motor or other important components of the electrically driven compressor 19, for example. It is fundamentally also possible to include thermal boundary conditions of other engine components here. In this context, a critical component temperature $T_{crit}$ is compared with an actual component temperature $T_{el. comp.}$ in that a difference is taken. And this difference is placed in a ratio to the critical component temperature $T_{crit}$. The relationship holds that $$f_{Temp} = \frac{T_{crit} - T_{el.Comp}}{T_{crit}}.$$

The thermal reduction factor $f_{Temp}$ thus determined additionally reduces the speed $n_{set, thermo, SoC}$ as needed by a factor that likewise varies between zero and one, namely to a greater degree the closer the component temperature $T_{el. comp}$ comes to the critical temperature. A speed $n_{set, thermo, SoC, Temp}$ results.

Finally, a consumption/recuperation factor $X_{Eco}$ is determined that takes into account the following factors. Firstly, the recuperated energy $E_{Recu}$ is taken into account, and the energy $E_{Boost}$ expended to drive the electrically driven charging device for dynamic assistance during build-up of the boost pressure $p_2$ is taken into account. This energy difference $\Delta E_{Eco}$ is captured over a second balance period $t_{v2}$. This second balance period corresponds here to a total operating cycle of the engine—for example the total trip duration.

In order to determine the factor, this difference $\Delta E_{Eco}$ is placed in a ratio to an assistance energy demand $E_{demand,Boost}$, which is determined over a traveling balance period $t_{v1}$ that is smaller than the balance period $t_{v2}$ and, as the latter extends, shifts with the continuously lengthening total operating cycle of the engine. The balance period $t_{v1}$ is a sliding time window. For this time period, which generally is between 1 and 10 min or, even better, between 2 and 3 min, the energy demand $E_{demand, Boost}$ is determined in that the energy demand is determined from the individual driving style, a route profile, or other operating state quantities. Characteristic maps, predictive calculations, or expected route profiles, which can be derived from a navigation system, for example, can be used for this purpose.

This consumption/recuperation factor $X_{Eco}$ only comes into use when the ratio between the energy balance over the balance period $t_{v2}$ and the energy demand $E_{demand,Boost}$ determined over the balance period $t_{v1}$ is less than one. Then, if applicable, the reduction factor thus determined further reduces the speed $n_{set, thermo, SoC, Temp}$ to the speed $n_{set, thermo, SoC, Temp, eco}$, which then corresponds to the speed setpoint $n_{set, EDC}$ of the motor 18. In the event that the reduction factor $X_{Eco}$ is greater than or equal to one, no reduction takes place. If no recuperated energy excess is available ($\Delta E_{Eco}=0$), the electrically driven charging device is prevented from being usable at all.

The choice of the duration of the first balance period $t_{v1}$, which is determined continuously and thus also applies to the other reduction factors $f_{thermo}$, $f_{SoC}$, and $f_{Temp}$, ensures that changes in the boundary conditions affect the reduction factor only gradually or stepwise, thus ensuring that the handling characteristics or responsiveness of the engine during acceleration change only gradually. In this way, abrupt changes in responsiveness can be precluded.

The same relationship is shown in FIG. 4 for an engine with an EAT in which the torque $M_{set, EAT}$ rather than the speed $n_{set, EDC}$ can be determined through the reduction factor or factors. Here, the recuperated energy $E_{Recu}$ can be fed directly into the vehicle electrical system 8 or the battery 8a through the electric motor 7.

In the implementation of the electrically driven charging device as the EDC 18, the recuperated energy can only be obtained through the electric machine (BSG) 11, and it is possible to establish, for example, that only a specific percentage of this recuperated energy can be made available as boost energy for the electric motor 18.

Figure 5:
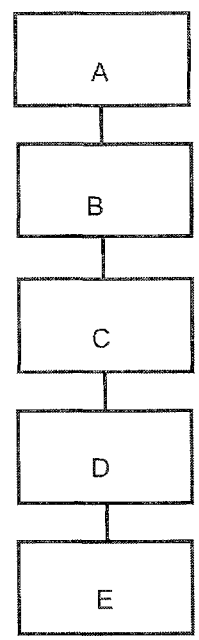
FIG. 5 shows a schematic representation of the method according to the invention.

FIG. 5 shows the sequence of the method according the invention for operating an internal combustion engine with a system for supercharging that includes an exhaust turbocharger 3 and an electrically driven charging device for dynamic assistance during build-up of boost pressure $p_2$. The following steps are provided here:

A determining a drive criterion $M_{set, EAT}$; $n_{set, EDC}$

B establishing an initial quantity of the drive criterion ($M_{EAT}$, $n_{EDC}$)

C continuously determining a reduction factor ($f_{thermo}$, $f_{SoC}$, $f_{Temp}$, $X_{Eco}$) for the drive criterion ($n_{set, EDC}$, $M_{set, EAT}$) within a balance period $t_{v1}$ D applying the reduction factor to the drive criterion E operating the charging device with the drive criterion reduced by the reduction factor.

In this context, embodiments are possible in which not all of the reduction factors specified above are taken into account, or individual reduction factors are taken into account only at certain times or within different balance periods $t_{v1}$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine with a system for supercharging that includes an exhaust turbocharger and an electrically driven charging device for dynamic assistance during build-up of boost pressure, the method comprising:
   determining a drive criterion of the charging device;
   establishing an initial quantity of the drive criterion;
   continuously determining a reduction factor for the drive criterion within a first balance period;
   applying the reduction factor to the initial quantity of the drive criterion; and
   operating the charging device with the drive criterion reduced by the reduction factor,
   wherein the reduction factor includes an electric consumption or recuperation factor,
   wherein the consumption or recuperation factor takes into account an energy difference determined over a second balance period between a recuperated energy quantity and an assistance energy quantity, and
   wherein the second balance period is a total operating time of the engine or a trip duration.

2. The method according to claim 1, wherein the drive criterion includes: a drive torque, a drive speed, a supply current, and/or a supply voltage.

3. The method according to claim 1, wherein the reduction factor includes the electric consumption or recuperation factor and one or more of a thermodynamic factor, a state of charge factor, and a temperature factor.

4. The method according to claim 3, wherein the consumption or recuperation factor takes into account the energy difference determined over the second balance period between the recuperated energy quantity and the assistance energy quantity, and a demand energy quantity determined for the first balance period using the following relationship:

$$X_{Eco} = \frac{\Delta E_{Eco}}{E_{demand,Boost}}.$$

5. The method according to claim 4, wherein the first balance period is less than the second balance period.

6. The method according to claim 4, wherein the first balance period is 1 to 10 min, or is 2 to 3 min.

7. The method according to claim 4, wherein the consumption or recuperation factor is taken into account as a reduction factor when the consumption or recuperation factor is less than one.

8. The method according to claim 3, wherein the thermodynamic factor is determined such that the thermodynamic factor reduces a maximum of the drive criterion such that a maximum thermodynamically reasonable boost pressure is built up during the dynamic assistance via the charging device.

9. The method according to claim 3, wherein the state of charge factor is determined from a difference between an actual state of charge and a state of charge limit.

10. The method according to claim 3, wherein the temperature factor is determined from a difference between a critical component temperature and an actual component temperature.

11. The method according to claim 10, wherein the temperature factor results from the relationship, where $T_{crit}$ is the critical component temperature and T is the actual component temperature:

$$f_{Temp} = \frac{T_{crit} - T}{T_{crit}}.$$

12. A control unit for the internal combustion engine that is equipped to adjust the system for supercharging according to the method from claim 1.

13. The electrically driven charging device being designed as an EAT or an EDC, and is operated according to the method from claim 1, wherein the drive criterion is a drive torque in a case of the charging device being an EAT and wherein the drive criterion is a drive speed in a case of the charging device being an EDC.

14. The internal combustion engine with the charging device according to claim 13.

15. A motor vehicle with the internal combustion engine according to claim 14.

16. The method according to claim 1, wherein within the second balance period, a total recuperated energy and a total assistance energy are offset against one another and/or balanced.

* * * * *